(12) United States Patent
Olofsson

(10) Patent No.: US 11,302,980 B2
(45) Date of Patent: Apr. 12, 2022

(54) ARRANGEMENT FOR ASSEMBLING RECHARGEABLE BATTERIES INTO A BATTERY MODULE AND A BATTERY MODULE

(71) Applicant: Toyota Material Handling Manufacturing Sweden AB, Mjölby (SE)

(72) Inventor: Håkan Olofsson, Linköping (SE)

(73) Assignee: Toyota Material Handling Manufacturing Sweden AB, Mjölby (SE)

( * ) Notice: Subject to any disclaimer, the term of this patent is extended or adjusted under 35 U.S.C. 154(b) by 275 days.

(21) Appl. No.: 16/276,610

(22) Filed: Feb. 14, 2019

(65) Prior Publication Data

US 2019/0259993 A1    Aug. 22, 2019

(30) Foreign Application Priority Data

Feb. 16, 2018    (SE) .................................... 1850177-5

(51) Int. Cl.
*H01M 2/10*    (2006.01)
*H01M 2/20*    (2006.01)
(Continued)

(52) U.S. Cl.
CPC ......... *H01M 50/20* (2021.01); *H01M 50/502* (2021.01); *H01M 2220/20* (2013.01); *Y02E 60/10* (2013.01)

(58) Field of Classification Search
CPC .. H01M 50/20; H01M 50/502; H01M 10/613; H01M 10/625; H01M 2220/20;
(Continued)

(56) References Cited

U.S. PATENT DOCUMENTS 6,444,353 B1 *   9/2002   Takaki ............. H01M 10/6556
                                                    429/120
6,498,406 B1 *  12/2002   Horiuchi ................ B60L 58/21
                                                    307/150
(Continued)

FOREIGN PATENT DOCUMENTS

CN           102593388          *   7/2012
CN           103718344          *   4/2014
(Continued)

OTHER PUBLICATIONS

The search report from the Swedish Patent Office, dated Aug. 31, 2018, 5 Pages, for Swedish Patent Application No. 1850177-5.
(Continued)

*Primary Examiner* — Kaity V Chandler
(74) *Attorney, Agent, or Firm* — Quarles & Brady LLP

(57) ABSTRACT

An arrangement for assembling rechargeable batteries into a battery module for a lift-truck, the rechargeable batteries including a base plate configured to support a respective bottom surface of at least a first and a second rechargeable battery and comprising a holder configured to fixate the position of the at least first and second rechargeable battery onto the base plate, and a cover plate configured to be arranged on a respective top of the at least first and second rechargeable battery and comprising an electrical contact configured to electrically connect the at least first and the second rechargeable battery in series, and at least a first and a second attachment for interlocking the base plate and the cover plate.

12 Claims, 7 Drawing Sheets

(51) Int. Cl.
*H01M 50/20* (2021.01)
*H01M 50/502* (2021.01)

(58) Field of Classification Search
CPC ............ H01M 10/647; H01M 10/486; H01M 10/0481; H01M 10/655; H01M 10/6555; H01M 10/6556; H01M 10/0525; H01M 10/425; H01M 2220/10; H01M 10/0486; H01M 10/052; H01M 10/12; H01M 10/48; H01M 10/60; H01M 10/643; H01M 10/653; H01M 10/6553; H01M 10/6557; H01M 10/6561; H01M 10/6563; H01M 10/6566; H01M 10/658; H01M 10/66; H01M 2200/10; H01M 50/10; H01M 50/172; H01M 50/209; H01M 50/3425; H01M 50/375; H01M 50/543; H01M 50/60; H01M 10/482; H01M 10/617; H01M 10/651; H01M 10/6551; H01M 10/6554; H01M 10/659; H01M 2010/4278; H01M 2200/20; H01M 50/107; H01M 50/15; H01M 50/30; H01M 50/308; H01M 50/325; H01M 50/35; H01M 50/394; H01M 50/50; H01M 50/578; H01M 6/48; H01M 8/0206; H01M 8/0213; H01M 8/0215; H01M 8/0247; H01M 8/0254; H01M 8/0258; H01M 8/026; H01M 8/0267; H01M 8/0297; H01M 8/10; H01M 8/2418

See application file for complete search history.

(56) References Cited

U.S. PATENT DOCUMENTS

| | | | | |
|---|---|---|---|---|
| 2005/0100783 | A1* | 5/2005 | Ro | H01M 10/486 429/159 |
| 2009/0239137 | A1* | 9/2009 | Kakuchi | H01M 50/463 429/151 |
| 2012/0148901 | A1* | 6/2012 | Okamoto | H01M 50/411 429/145 |
| 2012/0231305 | A1* | 9/2012 | Guen | H01M 50/60 429/53 |
| 2012/0282516 | A1* | 11/2012 | Kim | H01M 2/1077 429/159 |
| 2012/0301747 | A1* | 11/2012 | Han | H01M 50/20 429/7 |
| 2013/0288094 | A1* | 10/2013 | Noh | H01M 10/0413 429/99 |
| 2013/0288105 | A1 | 10/2013 | Niedzwiecki et al. | |
| 2015/0023392 | A1* | 1/2015 | Noh | G01K 13/00 374/185 |
| 2015/0180092 | A1* | 6/2015 | Nakagiri | H01M 10/345 320/118 |
| 2015/0222131 | A1 | 8/2015 | Kano | |
| 2018/0108955 | A1* | 4/2018 | Fees | H01M 50/56 |
| 2018/0241020 | A1* | 8/2018 | Lampe-Onnerud | H01M 50/24 |

FOREIGN PATENT DOCUMENTS

| | | | | |
|---|---|---|---|---|
| CN | 104781949 | * | 7/2015 | |
| CN | 106169543 | | 11/2016 | |
| CN | 206893667 | U | 1/2018 | |
| CN | 108075068 | A * | 5/2018 | ............ H01M 50/20 |
| DE | 102015215502 | | 2/2017 | |
| EP | 2219245 | A1 | 8/2010 | |
| EP | 2523246 | | 11/2012 | |
| WO | WO 2012133711 | * | 10/2012 | |

OTHER PUBLICATIONS

European Patent Office, Extended European Search Report, Application No. 19155067.2, dated May 20, 2019, 14 pages.

* cited by examiner

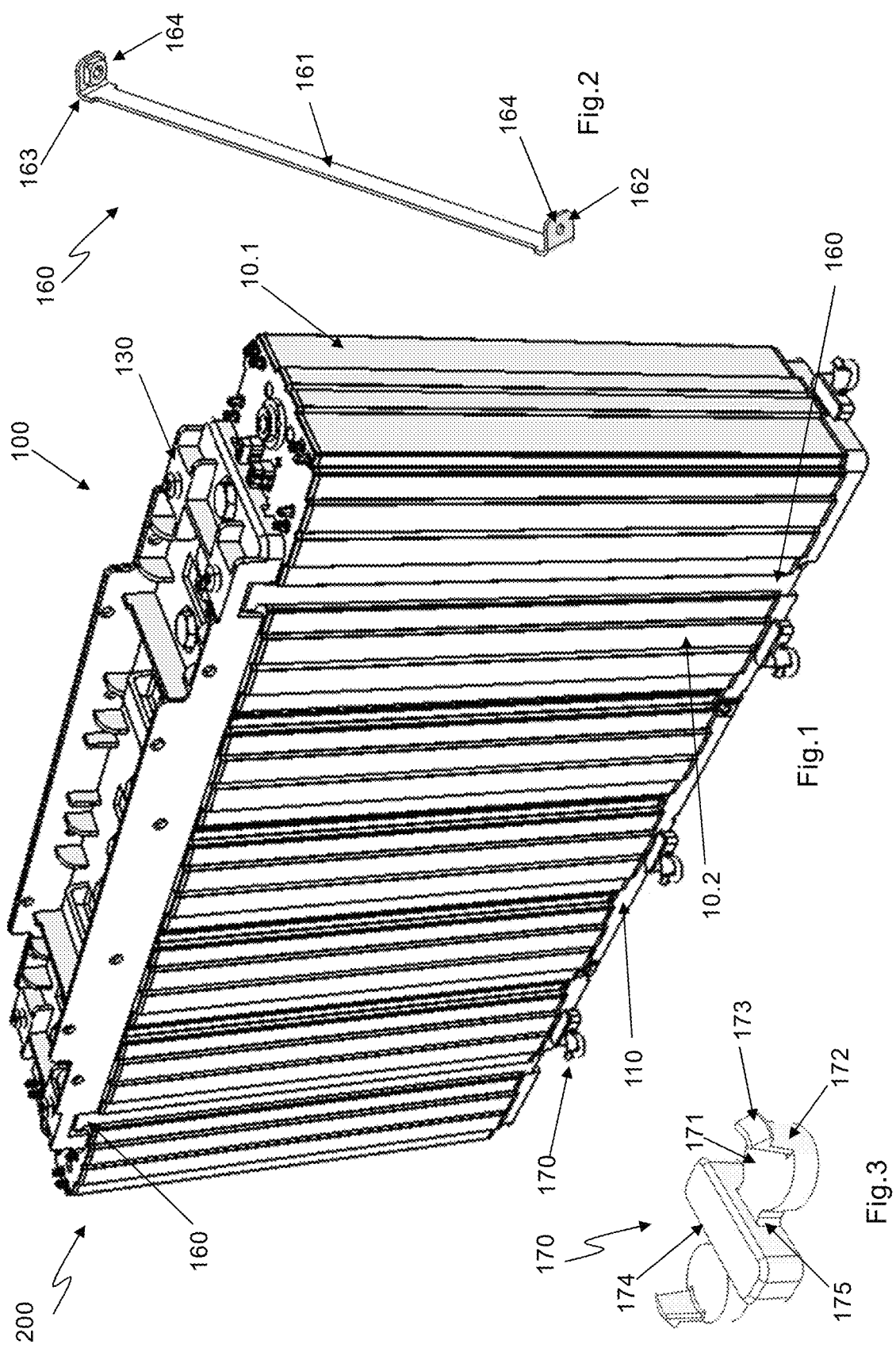

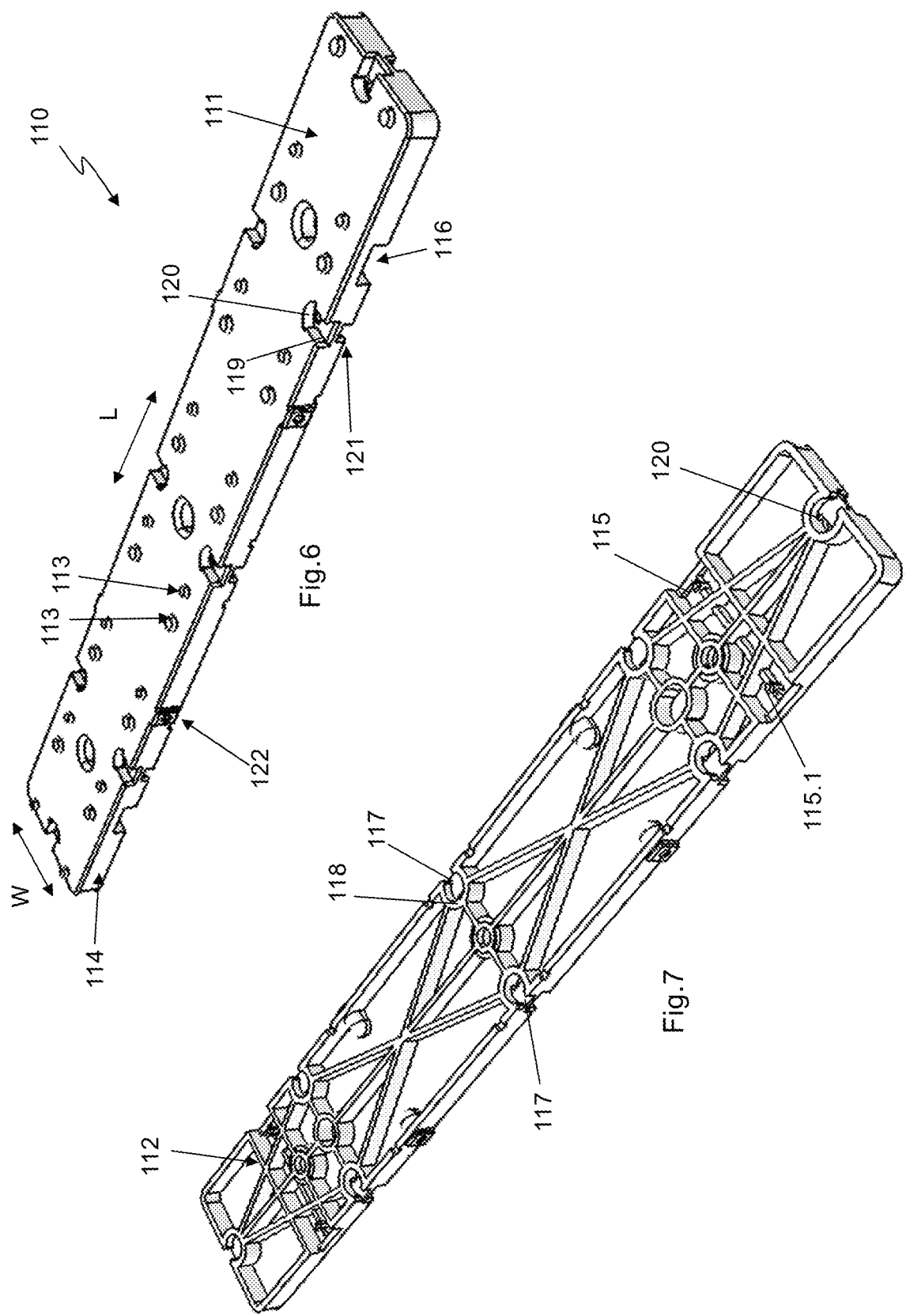

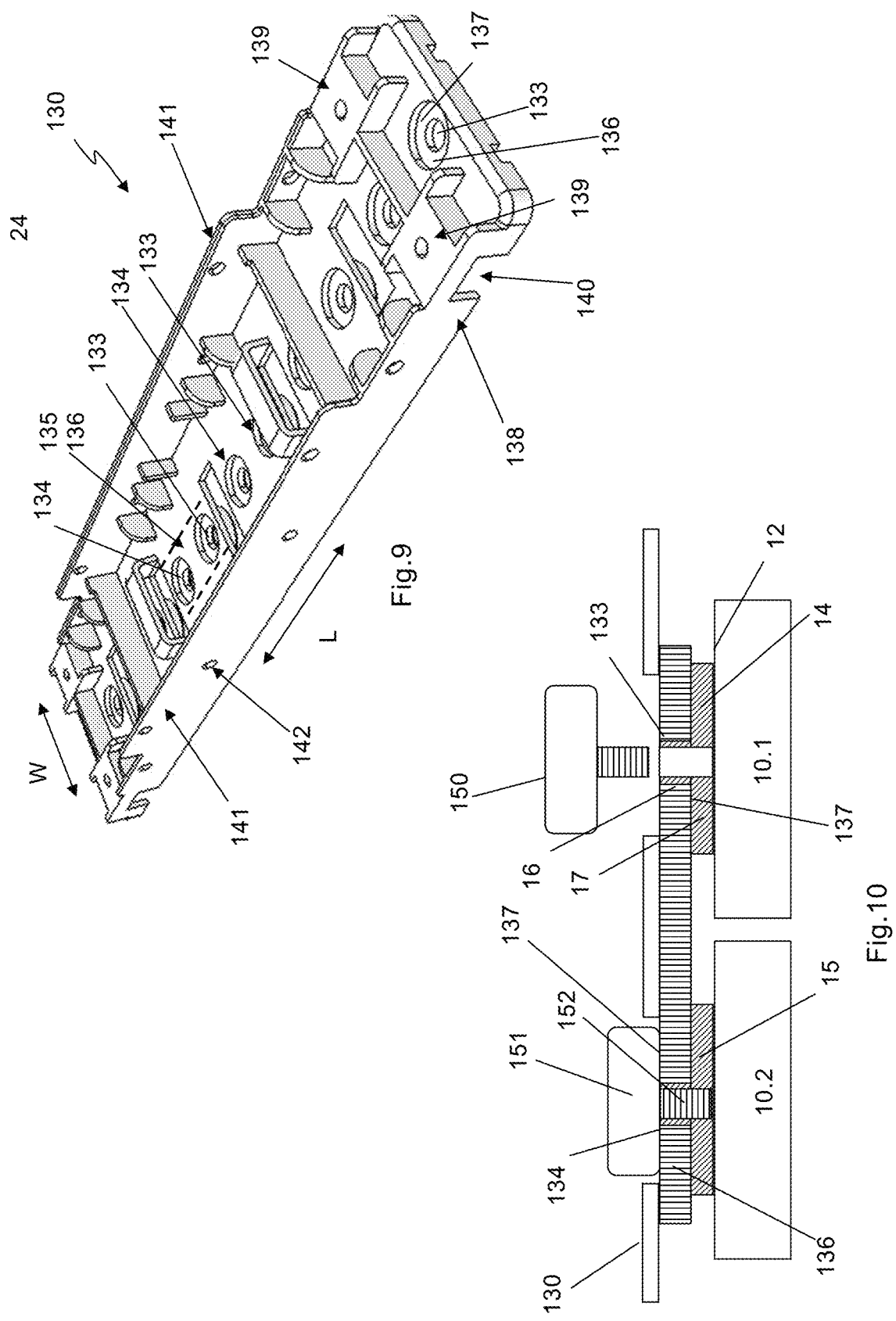

ARRANGEMENT FOR ASSEMBLING RECHARGEABLE BATTERIES INTO A BATTERY MODULE AND A BATTERY MODULE

CROSS REFERENCE TO RELATED APPLICATIONS

The application claims the priority benefit of SE 1850177-5 filed Feb. 16, 2018, the contents of which is hereby incorporated by reference as if set forth in its entirety.

TECHNICAL FIELD

The present disclosure relates to an arrangement for assembling rechargeable batteries into a battery module. The present disclosure also relates to a battery module comprising at least two rechargeable batteries and an arrangement for assembling the rechargeable batteries into a battery module.

BACKGROUND ART

Rechargeable Li-ion batteries are becoming an increasingly used electrical source for propelling lift-trucks due to their relatively short recharging time. The rechargeable Li-ion batteries are typically provided in the form of individual rechargeable battery cells, typically small cylinders that are stacked in a container and form a rechargeable battery. The maximum voltage of each rechargeable battery is limited and therefore it is necessary to electrically connect several rechargeable batteries to each other in order to achieve a working voltage suitable for the lift truck. Typically, lift-trucks run on a working voltage of 24V or 48V.

Attempts have been made to collect rechargeable batteries into larger modules. For example US20170170438 shows a battery module in the form of a box in which several rechargeable batteries are placed. Each rechargeable battery has a vertical flange with openings that makes it possible to bolt the rechargeable battery to partition walls in the box. Separate and not further disclosed electrical connections are provided to electrically interconnect the rechargeable batteries. The arrangement disclosed in US20170170438 is marred with drawbacks. For example, the process of gathering rechargeable batteries in a box and subsequently bolt the rechargeable batteries to the partition walls of the box and then electrically interconnect the rechargeable batteries is cumbersome and work intensive. Also, since the rechargeable batteries are collected in a box the maximum voltage as well as the geometrical design of the battery module is limited to specific applications.

Thus, it is an object of the present disclosure to provide an improved arrangement for assembling rechargeable batteries into a battery module that solves or at least mitigates at least one of the problems discussed above. In detail, it is an object of the present disclosure to provide an arrangement for assembling rechargeable batteries into a battery module that allows for easy assembly of the batteries in few working operations. It is a further object of the present disclosure to provide an arrangement for assembling rechargeable batteries into a battery module that allows for flexible design of battery modules.

It is also an object of the present disclosure to provide a simple and robust battery module that may be assembled in few working operations.

SUMMARY OF THE DISCLOSURE

According to the present disclosure, at least one of these objects is achieved by an arrangement 100 for assembling rechargeable batteries 10 into a battery module 200 for a lift-truck, the rechargeable batteries 10 having, respectively, a housing 11 with a bottom 18 and an opposing top 12 with a positive and a negative battery terminal 14, 15, the arrangement 100 comprising:

- a base plate 110 configured to support a respective bottom surface 19 of at least a first and a second rechargeable battery 10.1, 10.2 and comprising holders 113 configured to fixate the position of the at least first and second rechargeable battery 10.1, 10.2 onto the base plate 110;
- a cover plate 130 configured to be arranged on a respective top 12 of the at least first and second rechargeable battery 10.1, 10.2 and comprising an electrical contacts 135 configured to electrically connect the at least first and the second rechargeable battery 10.1, 10.2 in series, and;
- at least a first and a second attachment 160 for interlocking the base plate 110 and the cover plate 130.

The arrangement for assembling rechargeable batteries 10 according to the present disclosure provides a simple solution for assembling a plurality of pre-manufactured rechargeable rechargeable batteries into a battery module. The claimed arrangement is very suitable for manual assembly of battery modules since it only requires a minimum of working steps to assemble the rechargeable battery. In practice, the person assembling the battery modules needs only to place the rechargeable batteries onto the base plate, apply the cover plate on top of the respective rechargeable batteries and subsequently interlock the base plate and the cover plate with the attachments. Electrical series connection of the rechargeable batteries is achieved when the cover plate is applied onto the tops of the rechargeable batteries.

Preferably, the base plate 110, and possibly also the cover plate 130, is rectangular and has a width (W) and a length (L), whereby the width (W) of the base plate (100 is substantially equal to or less than the width (w) of each rechargeable battery 10. This is a favorable way of designing the claimed arrangement for providing a standard battery module which consist of a single row of rechargeable batteries. Several battery modules may then be put together into larger aggregates to fit the power need of different truck types.

Preferably, the holders 113 are protrusions extending from the base plate 110 and configured to be received in corresponding recesses 20 provided in a bottom surface 19 of each rechargeable battery 10. This provides a simple, yet effective way of fixating the rechargeable batteries on to the upper surface of the base plate in order to prevent parallel movement between the base plate and the rechargeable batteries. A person assembling the module may easily mount the rechargeable battery on the base plate such that the protrusions of the base plate are received in the recesses in the bottom surface of the rechargeable batteries.

Preferably, the protrusions 113 are arranged in a first and a second parallel row along the length (L) of the base plate 110. It is thereby advantageous that the bottom surface 19 of each rechargeable battery 10 comprises at least a first and second recess 20 and that the number of protrusions 113 on the base plate 110 correspond to the total number of recesses 20 of the rechargeable batteries 10. This makes it easy for a person to place the rechargeable batteries in correct position on the base plate and the rechargeable batteries are simultaneously prevented from rotating on the base plate by the provision of two recesses in each bottom surface.

Preferably, the arrangement for assembling rechargeable batteries comprises a first and a second fastener 150, 150 for attaching the cover plate 110 to the respective top 12 of each rechargeable battery 10. The arrangement for assembling rechargeable batteries will thereby be completely locked to all the rechargeable batteries. As a consequence thereof any movement between the separate rechargeable batteries and the components of the arrangement for assembling rechargeable batteries is reduced or eliminated in all directions.

Advantageously, the cover plate 130 comprises a first opening 133 for receiving a terminal 14, 15 of a first rechargeable battery 10.1 and a second opening 134 for receiving a terminal 14, 15 of a second rechargeable battery 10.2, wherein the electrical contact 135 comprises electrically conductive sheet material 136 arranged around the respective first and the second opening 133, 134 and extending between the first and the second opening 133, 134. The first and the second fastener 150, 150 may thereby be configured to clamp the electrically conductive sheet material 136 of the first and the second opening 133, 134 of the cover plate 130 to the respective terminal 14, 15 of the first and second rechargeable battery 10.1, 10.2. This provides an efficient way of locking the cover plate to the top of the rechargeable batteries and simultaneous achieve electrical series connection of the rechargeable batteries.

In addition, the terminals 14, 15 of each rechargeable battery 10 comprises a threaded bore 16 and a contact surface 17 and the fastener 150 comprises a head 151 and a corresponding threaded portion 152 configured to be received in the threaded bore 16 of a terminal 14, 15 of a rechargeable battery 10, such that the head 151 of the fastener 150 is clamped against one side of the electrically conductive sheet material 136 of an opening 133, 134 and the contact surface 17 of the terminal 14, 15 is clamped against the other side of the electrically conductive sheet material 136 of the opening 133, 134. The result thereof is a very strong attachment of the cover plate to the respective tops of the rechargeable batteries and a secure electrical series connection of the rechargeable batteries.

In the arrangement for assembling rechargeable batteries, the first and the second attachment 160, 160, comprises preferably an elongated central portion 161 and a first end flange 162 and a second end flange 163 and the base plate 110 and the cover plate 130 respectively comprises opposing first and second side edges 114; the base plate 110 and the cover plate 130 may thereby comprise, respectively, at least a first seat 115, 115 and second seat 139, 139 arranged opposite each other and having a respective opening 116, 140 in a respective one of the opposing side edges 114 of the base plate 110 and the cover plate 130. Preferably, a respective first end flange 162 of the attachment 160 is configured to be attachable received in a seat 115 of the base plate 110 through the opening 116 of the seat 115 and a respective second end flange 163 of the attachments 160 is configured to be attachably received in a seat 139 of the cover plate 130 through the opening 14 of the seat 139. The advantage thereof is that the end flanges are easy to insert into the seats and that, in use, the end flanges are protected by the seats.

The arrangement 100 for assembling rechargeable batteries may also comprise a joining connector 170 for joining the arrangement 100 for assembling rechargeable batteries to another, identical, arrangement 100 for assembling rechargeable batteries 100. This allows for easy build-up of larger battery aggregates for lift-trucks that requires large supplies of electric power.

The present disclosure also relates to a battery module 200 for a lift-truck comprising at least a first and a second rechargeable battery 10.1, 10.2 having a housing 11 with a bottom 18 and an opposing top 12 with a positive and a negative battery terminal 14, 15 and an arrangement 100 for assembling the at least first and second rechargeable batteries 10.1, 10.2 into a battery module 200 the arrangement 100 comprises:

a base plate (110) supporting a respective bottom surface (19) of the at least first and second rechargeable battery (10.1, 10.2) and comprising holders (113) arranged to fixate the position of the at least first and second rechargeable battery (10.1, 10.2) onto the base plate (110) and;

a cover plate (130) arranged on a respective top (12) of the at least first and second rechargeable battery (10.1, 10.2) and comprising an electrical contact (135) arranged such that the at least first and the second rechargeable battery (10.1, 10.2) are electrically connected in series, and;

at least a first and a second attachment (160) arranged to interlock the base plate (110) and the cover plate (130).

In the present disclosure a "rechargeable battery" is meant to comprise two or more individual, rechargeable battery cells which are electrically connected to jointly output electrical power. A "rechargeable battery" may also be denominated "rechargeable battery unit" or "battery unit".

In the present disclosure "battery module" may further be denominated "battery assembly" or "arrangement of rechargeable batteries".

BRIEF DESCRIPTION OF THE DRAWINGS

FIG. 1: A schematic drawing of an arrangement for assembling rechargeable batteries and a battery module according to the present disclosure.

FIG. 2: A schematic drawing of an attachment of the arrangement for assembling rechargeable batteries according to the present disclosure.

FIG. 3: A schematic drawing of a joining connector of the arrangement for assembling rechargeable batteries according to the present disclosure.

FIGS. 6 and 7: Schematic drawings of a base plate of the arrangement for assembling rechargeable batteries of the present disclosure.

FIG. 9: A schematic drawing of a cover plate of the arrangement for assembling rechargeable batteries of the present disclosure.

FIG. 10: A schematic drawing of a portion of a cover plate of the arrangement for assembling rechargeable batteries of the present disclosure.

DETAILED DESCRIPTION OF EMBODIMENTS

Figure 5:
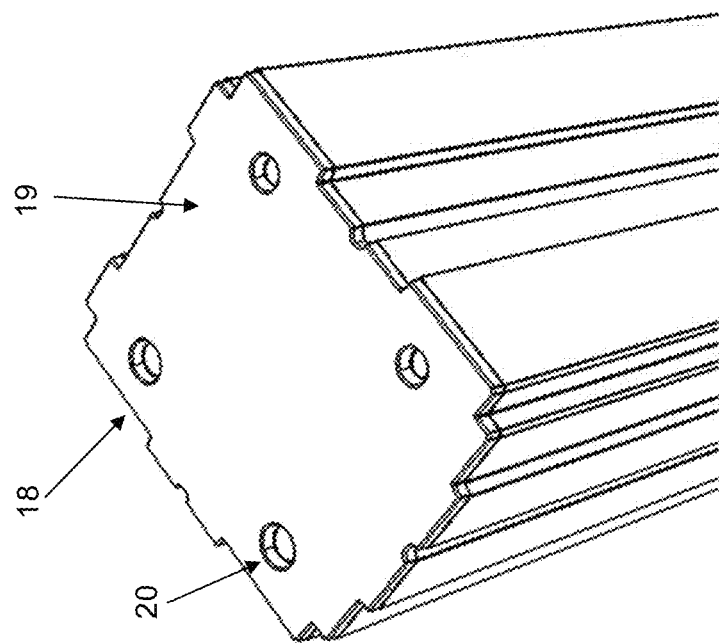
FIGS. 4 and 5: Schematic drawings of a rechargeable battery.

The arrangement for assembling rechargeable batteries into a battery module for a lift-truck according to the present disclosure will now be described more fully hereinafter. The arrangement for assembling rechargeable batteries into a battery module for a lift-truck according to the present disclosure may however be embodied in many different forms and should not be construed as limited to the embodiment set forth herein. Rather, these embodiments are provided by way of example so that this disclosure will be thorough and complete, and will fully convey the scope of the present disclosure to those persons skilled in the art.

Where appropriate, the arrangement for assembling rechargeable batteries into a battery module for a lift-truck may be referred to as "the arrangement". Moreover, although specific terms may be employed herein, they are used in a generic and descriptive sense only and not for purposes of limitation. Furthermore, as used herein, the terms "comprise/comprises" or "include/includes" do not exclude the presence of other elements. Finally, reference signs in the claims are provided merely as a clarifying example and should not be construed as limiting the scope of the claims in any way.

FIG. 1 shows an exemplary embodiment of a battery module 200 comprising an arrangement 100 for assembling rechargeable batteries into a battery module for a lift-truck according to the present disclosure. In the disclosed embodiment, the battery module 200 comprises seven rechargeable batteries 10. However, the battery module 200 may comprise at least two rechargeable batteries 10 or any suitable number of more than two rechargeable batteries. In order not to obscure the drawings, only the first and the last rechargeable battery have been indicated with reference signs 10.1, 10.2. The arrangement 100 comprises a base plate 110 for supporting the rechargeable batteries 10 and a cover plate 130 configured to be arranged on top of the rechargeable batteries 10 and attachments 160 that are arranged to interlock the cover plate 130 and the base plate 110. The attachments 160 may also be denominated connectors or mechanical connectors. By "interlock" it is meant that one end of each attachment 160 is attached to the base plate 110 and the other end of the attachment 160 is attached to the cover plate 130. In the disclosed embodiment two attachments 160 are provided on each long side of the arrangement 100. However, the arrangement may comprise at least two attachments 160, or more. The arrangement 100 may further comprise a fastener 150, such as threaded bolts, for attaching the cover plate 130 to the top of the rechargeable batteries. The arrangement 100 may further comprise one or more joining connectors, 170 for joining the battery module 200 to another identical battery module (not shown).

The various components of the battery module 200 and the arrangement 100 will in the following be described with reference to FIGS. 2-6.

FIG. 2 shows an attachment 160, which comprises an elongated central portion 161 and a first and second end flange 162, 163 that respectively extends perpendicular from the central portion 161. The first and second end flanges 162, 163 may comprise a respective opening 164 for receiving a screws or protrusion in order to attach the first and second end flanges 162, 163 to the base plate 110 and to the cover plate 130. The attachments 160 are narrow and elongated. Thus the width of the attachments 160 is less than the width or the length of the bottom surface 19 of a rechargeable battery 10. The length of the attachments 160 can be greater than the height of a rechargeable battery and selected such that the first end flange 162 may be attached to the base plate 110 and the second end 163 may be attached to the cover plate 130. The attachment 160 is rigid and may be manufactured from metal, e.g., steel strip or hard plastic material, as non-limiting examples.

FIG. 3 shows a joining connector 170, which comprises a first and second locking body 171 arranged symmetrically on opposite sides of a bridging part 174. Each locking body 171 is connected to the bridging part by an extension portion 175 and comprises a stem 172 that extends perpendicular from the locking body 171 and that comprises a shoulder 173 at its end.

Figure 4:
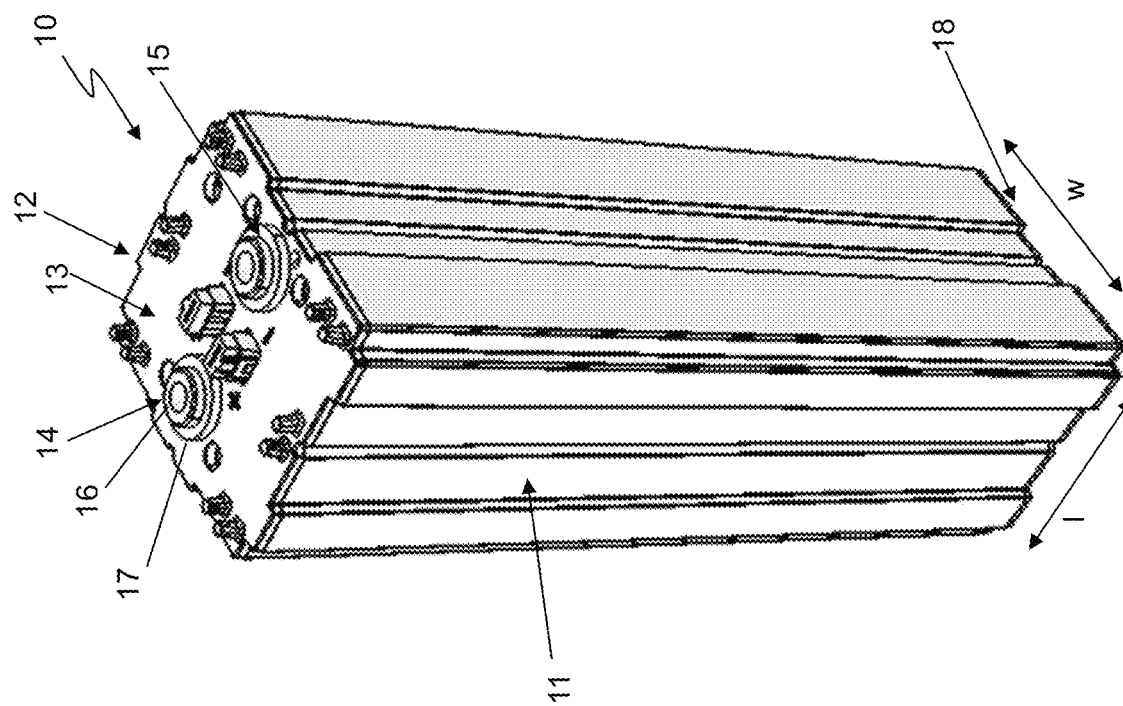

FIG. 4 shows a rechargeable battery 10 which is configured to be assembled, together with at least one further identical rechargeable battery, by an arrangement according to the present disclosure into a battery module for a lift-truck. The rechargeable battery 10 comprises an elongated housing 11 of rectangular cross-section that has a closed top 12 and a closed bottom 18 having a length l and a width w. The top 12 comprises a flat top surface 13 and a positive battery terminal 14 (anode) and a negative battery terminal 15 (cathode). The battery terminals are spaced apart and oriented next to each other along the center of the top surface. The battery terminals 14, 15 protrude axially from the top surface 13 and comprises a central threaded bore 16 and an annular contact surface 17 arranged concentrically with the threaded bore 16. The housing 11 encloses at least two individual battery cells, such as rechargeable Lithium-ion battery cells (not shown) that are electrically connected to the terminals 14, 15 of the rechargeable battery 10.

FIG. 5 shows the bottom 18 of the rechargeable battery 10 of FIG. 2. The bottom 18 comprises a flat bottom surface 19 that is provided with recesses 20. In the embodiment shown in FIG. 5, four recesses 20 are provided, spaced apart from each other, and oriented adjacent the corners of the rectangular bottom surface 19. However, the number of recesses 20 may be fewer than four, e.g., at least two recesses 20 may be provided in the bottom surface of the rechargeable battery 10.

FIG. 6 shows the base plate 110 of the arrangement 100. The base plate 110 may be elongate and rectangular. The width W of the base plate 110 is substantially equal to the width w of bottom surface 19 of the rechargeable battery 10 (see FIG. 4). The length L of the base plate 110 is substantially equal the combined length l of the bottom surfaces of the rechargeable batteries 10 included in the battery module. Thus, the length L of the base plate 110 may be substantially equal the combined length l of the bottom surface 19 of at least two rechargeable batteries 10.

The base plate 110 has an upper surface 111 that is configured to support the bottom surfaces of 19 of at least two rechargeable batteries 10. That is, at least two rechargeable batteries 10 may be placed onto the upper surface 111 of the base plate 110. The upper surface 111 of the base plate 110 comprises holders 113 that are configured to fixate the position of the at least two rechargeable batteries 10 onto the base plate 110. As shown in FIG. 4, the holders 113 of the base plate 110 may be protrusions that extend axially from the upper surface 111 of the base plate 110. The protrusions 113 are configured to be received in the corresponding recesses 20 in the bottom surface 19 of the rechargeable batteries 10. That is, the holders 113 on the upper surface of the base plate 110 are configured to engage with the corresponding holders in a form of recesses in the bottom surface 19 of the at least two rechargeable batteries 10. By "fixating" it is meant that the rechargeable batteries 10 are prevented from moving parallel with, i.e., slide on, the upper surface 111 of the base plate 110. The protrusions 113 are distributed over the upper surface 111 of the base plate 110 such that the rechargeable batteries 10 may be placed adjacent each other in a row on the base plate. In FIG. 4, the protrusions 113 are arranged in two parallel rows along the length L of the base plate.

The base plate 110 further comprises a circumferential edge 114.

The base plate 110 further comprises at least a first and a second attachment seat 115, for receiving a respective first end flange 162 of the attachment 160. Turning to FIG. 7, each seat 115 comprises a portion of the lower surface 112 of the base plate 110 onto which the first end flange 162 of the attachment 160 is supported. In use, this portion of the lower surface 112 of the base plate 110 supports the first end flange 162 of the attachment 160. The seat 115 further comprises an opening 116 in the circumferential edge 114 of the base plate 110 through which the first end flange 162 of the attachment 160 is insertable (see FIG. 6). The first end flange 162 may be attached in the seat 115 by a protrusion 115.1 in the lower surface 112 of the base plate 111. However, the end flange 162 may also be attached in the seat by a screw or by press-fitting, as non-limiting examples.

The base plate 110 further comprises a first locking body seat 117 for receiving a locking body 171 of a joining connector 170 for joining the battery module 200 to another identical battery module. Turning to FIG. 7, the seat 117 comprises a portion of the lower surface 112 of the base plate 110 which is configured to receiving the locking body 171. The seat 117 may thereby comprises a limiting wall 118 which encloses the area of the seat 117. The seat 117 further comprises a recess 119 in the upper surface 111 of the base plate 110 forming an abutment surface for the shoulder 173 of the locking body 171. The seat 117 further comprises a through opening 120 in the base plate 110 through which the stem 172 of the locking body 171 may extend. The seat 117 further comprises an opening 121 in the circumferential edge 114 of the base plate 110 through which the extension portion 175 of the joining connector may extend.

Figure 11:
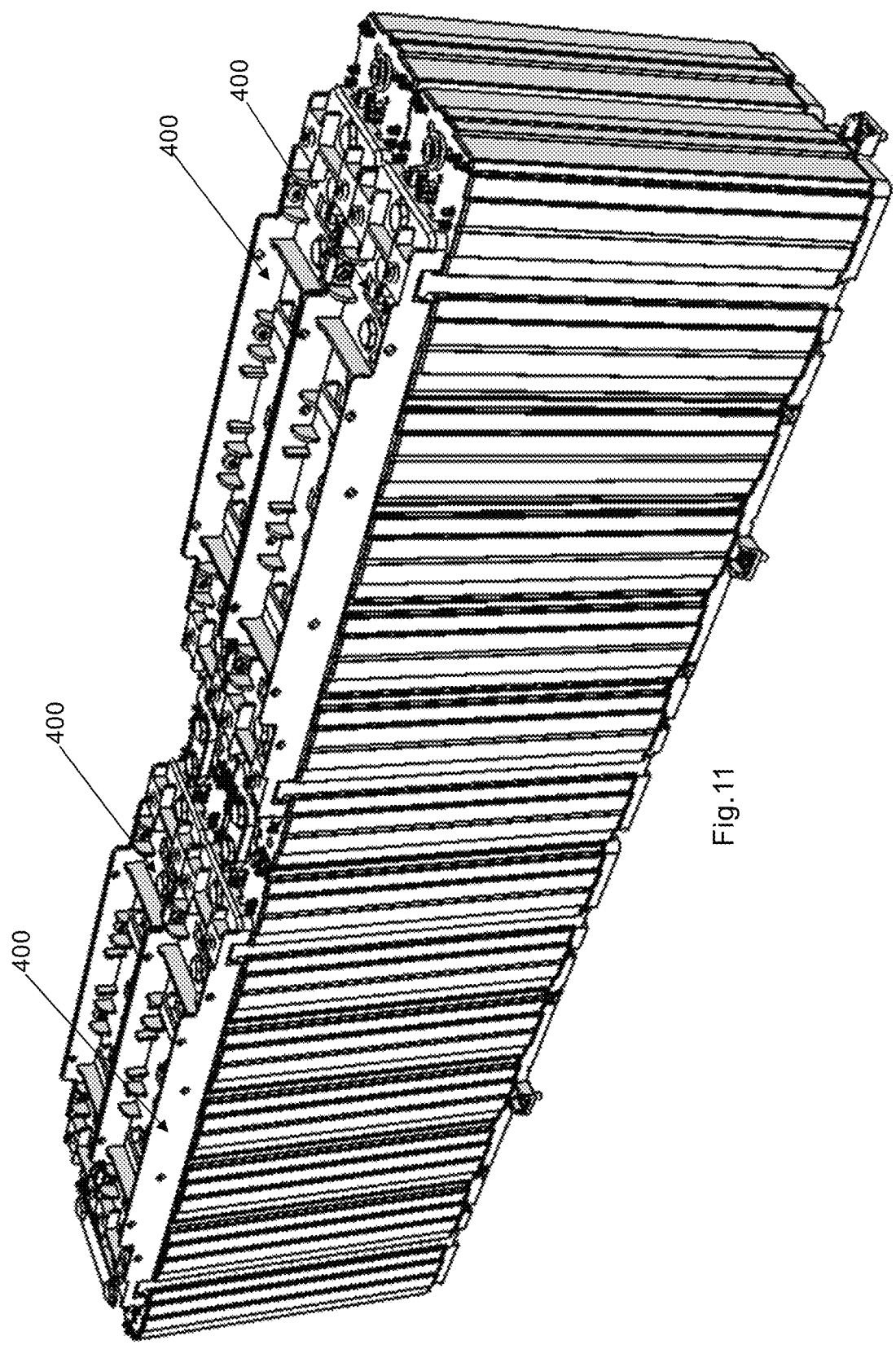
FIGS. 11 and 12: Schematic drawings of aggregates of battery modules according to the present disclosure.

FIG. 11 shows four battery modules 400 that have been joined to each other by joining connectors 170 (not shown) inserted into the seats 117 in the base plates 110 of the respective battery modules.

Figure 12:
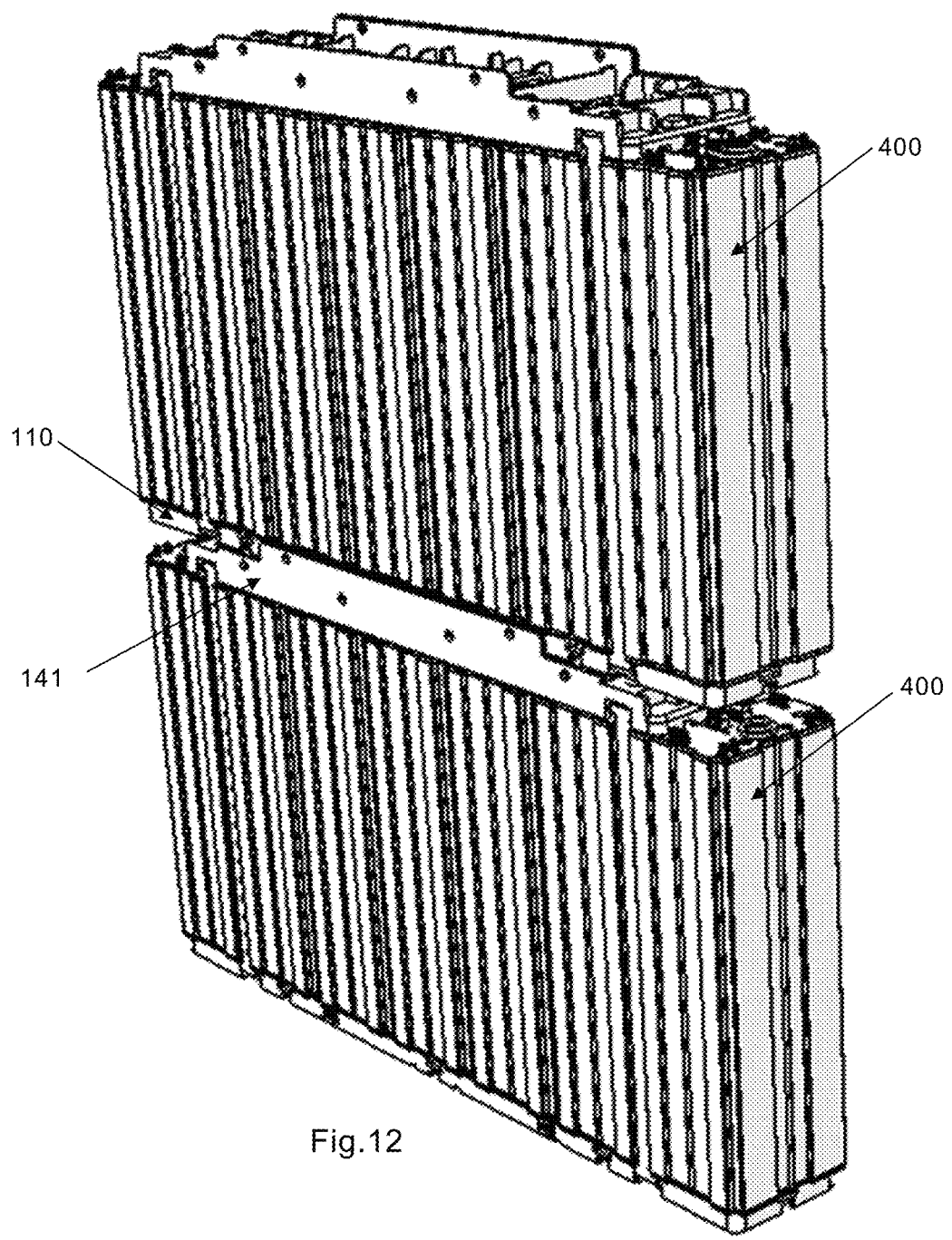

Returning to FIG. 6, the base plate 111 may further comprise openings 122 arranged in the long sides of the circumferential flange 120 for joining the battery module 200 to joining flanges of the cover plate of an identical battery module. FIG. 12 shows a first battery module 400 that has placed on top of a second battery module 400. The joining flanges 141 of the second battery module 400 has been attached to the base plate 110 of the first battery module 400 by screws.

Figure 8:
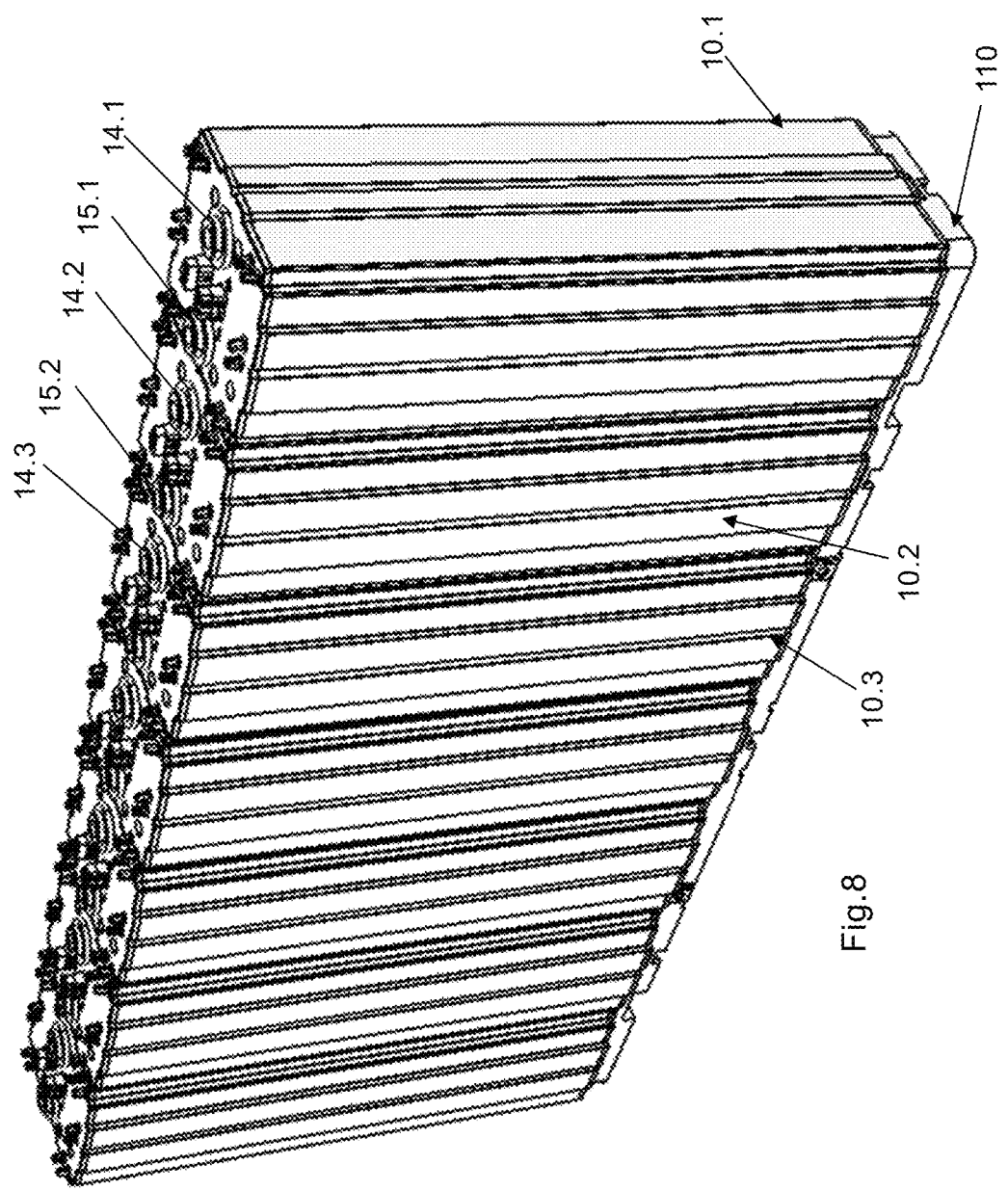
FIG. 8: A schematic drawing of a base plate of the arrangement for assembling rechargeable batteries of the present disclosure and rechargeable batteries.

FIG. 8 shows a row of seven rechargeable batteries 10 supported on the base plate. It may be noted that the rechargeable batteries 10 are arranged alternatingly with regards to the terminals. That is, adjacent rechargeable batteries 10 are positioned such that a positive terminal 14 of one rechargeable battery 10 is adjacent (i.e., next to) a negative terminal 15 of an adjacent rechargeable battery 10.

FIG. 9 shows the cover plate 130. The cover plate 130 is rectangular and has a width W that is substantially equal to the width w of the top surface 13 of a rechargeable battery 10. The length L of the cover plate 130 may be substantially equal to the combined length 1 of the top surfaces 13 of the rechargeable batteries 10 included in the battery module. That is, substantially equal to the combined length 1 of the top surfaces 13 of at least two rechargeable batteries 10. However, preferably the length L of the cover plate 130 is less than the combined length 1 of the top surfaces 13 of the rechargeable batteries 10 included in the battery module and selected such that the outermost terminals 14, 15 of the outermost rechargeable batteries 10 in a row of rechargeable batteries 10 are exposed to the environment. That is, not covered by the cover plate 130. The cover plate 130 further comprises a circumferential edge 138 which supports the cover plate onto the top surface 13 of the rechargeable battery 10. The cover plate 130 further comprises at least a first and a second attachment seat 139 for receiving a second flange 163 of the attachments 160 (see FIG. 2). Each of the seats 139 comprises a portion of the lower surface of the cover plate (not shown) onto which the second flange 163 is supported. The seat 139 further comprises an opening 140 in the circumferential edge 138 of the cover plate through which the second flange 163 of the attachment 160 is insertable. The second flange 163 may be attached in the seat 139 by a screw or by press-fitting.

The cover plate 130 may further comprise first and second joining flanges 141 that extend perpendicular from the long sides of the cover plate 130. The joining flanges 141 comprises openings 142 for connecting the battery module 200 with the base plate of an identical second battery module 200 that is placed on top of the present battery module (see FIG. 12).

The cover plate 130 further comprises electrical contacts 135 that are configured to electrically connect the rechargeable batteries 10 of the battery module in series. That is, configured to electrically connect at least a first and a second rechargeable battery 10.1, 10.2 in series.

The cover plate 130 thereby comprises at least one pair of through openings 133, 134 that are arranged next to each other in longitudinal direction of the cover plate. When the cover plate comprises more than one pair of openings, the openings 133, 134 are arranged in a row in a longitudinal direction of the cover plate.

The openings 133, 134 are arranged to receive adjacent terminals 14, 15 of two adjacent rechargeable batteries 10. Thus, with regards to the row of rechargeable batteries 10 of FIG. 8, a first pair of openings 133, 134 are configured to receive terminals 15.1 and 14.2 of rechargeable batteries 10.1, 10.2. A second pair of openings 133, 134 in the cover plate are configured to receive terminals 15.2 and 14.3 of the rechargeable batteries 10.2, 10.3 and so on.

The electrical contacts 135 may comprise electrically conductive sheet material 136 that is arranged around the openings 133, 134 of each pair of openings and that extends between the openings 133, 134 of each pair openings. The electrically conductive sheet material 136 is for example a copper sheet that is arranged on the lower surface 132 of the cover plate 130 (schematically shown with dashed lines in FIG. 9). The electrically conductive sheet material 136 thus form a planar contact surface 137 around, i.e., concentrically with, each opening 133, 134.

FIG. 10 shows schematically the assembly of the cover plate onto the top 12 of the respective rechargeable batteries 10. Thus, terminals 14, 15 of two adjacent the rechargeable batteries 10 extends into the openings 133, 134 of the cover plate 124. The contact surface 137 of the electrically conductive sheet material 136 rests onto the contact surface 17 of the terminals 14, 15. A fastener 150 in the form of a bolt with a threaded shaft 152 and a head 151 is screwed into the threaded bore 16 of each terminal 14, 15 until the head 151 is in engaging contact with the upper side of the contact surface 137 of the electrically conductive sheet material 136. The lower side of the electrically conductive sheet material 136 is thus clamped against the contact surfaces 17 of the adjacent terminals 14, 15. This ensures that good electrical series connection is achieved between the terminals of adjacent rechargeable batteries. It also ensures that parallel movement between the cover plate 130 and the top 12 of the respective rechargeable batteries 10 is prevented.

The invention claimed is:

1. An arrangement for assembling rechargeable batteries into a battery module for a lift-truck, the rechargeable batteries having, respectively, a housing with a bottom and an opposing top, the top comprising a positive and a negative battery terminal, the arrangement comprising:

a base plate configured to support a respective bottom surface of at least a first and a second rechargeable battery and comprising at least a first and a second holder configured to fixate the position of the at least first and second rechargeable batteries onto the base plate;

a cover plate configured to be arranged on a respective top of the at least first and second rechargeable batteries and comprising an electrical contact configured to electrically connect the at least first and the second rechargeable batteries in series; and at least a first and a second attachment for interlocking the base plate and the cover plate; and wherein the at least first and second holders comprise protrusions extending from the base plate and configured to be received in corresponding recesses in a bottom surface of each rechargeable battery.

2. The arrangement according to claim 1, wherein the base plate is rectangular and has a width (W) and a length (L), whereby the width (W) of the base plate is substantially equal to, or less than, a width (w) of each rechargeable battery.

3. The arrangement according to claim 1, wherein the protrusions are arranged in a first and a second parallel row along a length (L) of the base plate.

4. The arrangement according to claim 1, wherein the bottom surface of each rechargeable battery comprises at least a first and a second recess and wherein the number of protrusions on the base plate correspond to the total number of recesses of the rechargeable batteries.

5. The arrangement according to claim 1, wherein the cover plate is rectangular and has a width (W) and a length (L) whereby the width (W) of the cover plate is substantially equal to a width (w) of each rechargeable battery.

6. The arrangement according to claim 1, further comprising a first and a second fastener for attaching the cover plate to the respective top of each rechargeable battery.

7. The arrangement according to claim 6, wherein the first and the second fasteners are configured to clamp electrically conductive sheet material of the first and the second openings of the cover plate to the respective terminal of the first and second rechargeable batteries.

8. The arrangement according to claim 7, wherein the terminals of each rechargeable battery comprises a threaded bore and a contact surface and wherein the fastener comprises a head and a corresponding threaded portion configured to be received in the threaded bore of the terminal of the rechargeable battery, such that the head of the fastener is clamped against one side of the electrically conductive sheet material of the opening and the contact surface of the terminal is clamped against the other side of the electrically conductive sheet material of the opening.

9. The arrangement according to claim 1, wherein the cover plate comprises a first opening for receiving a terminal of a first rechargeable battery and a second opening for receiving a terminal of a second rechargeable battery, wherein the electrical contact comprises electrically conductive sheet material arranged around the respective first and the second opening and extending between the first and the second opening.

10. The arrangement according to claim 1, wherein the first and the second attachment, respectively comprises an elongated central portion and a first end flange and a second end flange;
- wherein the base plate comprises opposing first and second side edges and the cover plate comprises opposing first and second side edges;
- wherein the base plate comprises at least a first and a second seat having a respective opening in a respective one of the opposing side edges of the base plate, and the cover plate comprises at least a first and a second seat having a respective opening in a respective one of the opposing side edges of the cover plate; and
- wherein a respective first end flange of the first and the second attachment is configured to be attachable received in a respective seat of the base plate through the opening and a respective second end flange of the first and the second attachment is configured to be attachable received in a respective seat of the cover plate through the opening.

11. The arrangement according to claim 1, further comprising a joining connector for joining the arrangement to another, identical, arrangement for assembling rechargeable batteries.

12. A lift-truck comprising:
at least a first and a second rechargeable battery having a housing with a bottom and an opposing top, the top comprising a positive and a negative battery terminal and an arrangement for assembling the at least first and second rechargeable batteries into a battery module according to claim 1.

* * * * *